United States Patent [19]

Garnatz et al.

[11] Patent Number: 4,875,537
[45] Date of Patent: Oct. 24, 1989

[54] DISPOSABLE OIL ABSORBENT DRIP PAD ASSEMBLY FOR A VEHICLE

[75] Inventors: Anthony H. Garnatz, Mt. Clemens; William M. Ronne, Sterling Heights, both of Mich.

[73] Assignee: Garon Corp., Mt. Clemens, Mich.

[21] Appl. No.: 190,390

[22] Filed: May 5, 1988

[51] Int. Cl.⁴ .................................................. B62D 25/20
[52] U.S. Cl. ........................................ 180/69.1; 184/106; 296/38
[58] Field of Search ................ 180/69.1; 184/1.5, 106; 4/252 A; 123/198 E; 220/1 C; 222/108; 296/38; 431/119; 99/446; 126/51; 428/74

[56] References Cited

U.S. PATENT DOCUMENTS

| | | | |
|---|---|---|---|
| 1,094,210 | 4/1914 | Hughes | 184/106 |
| 1,524,434 | 1/1925 | Heinemann et al. | 180/69.1 X |
| 1,630,639 | 5/1927 | Taylor | 180/69.1 |
| 2,670,567 | 3/1954 | Meyer | 428/74 |
| 2,783,848 | 3/1957 | Beskid | 180/69.1 |
| 2,938,602 | 5/1960 | Horrocks | 184/106 |
| 3,228,491 | 1/1966 | Gatsos | 184/106 |
| 3,282,381 | 11/1966 | Fitzpatrick | 184/106 |
| 3,284,273 | 11/1966 | Prentice | 428/76 |
| 3,316,995 | 5/1967 | Fay | 180/69.1 |
| 3,329,231 | 7/1967 | Takenouchi | 180/69.1 |
| 3,333,652 | 8/1967 | Tribuzi | 180/69.1 |
| 3,354,989 | 11/1967 | Anderson | 180/69.1 X |
| 3,454,124 | 7/1969 | Niedek | 180/69.1 |
| 3,651,884 | 3/1972 | Dorries | 180/69.1 |
| 3,669,204 | 6/1972 | Andrews | 180/69.1 |
| 3,785,451 | 1/1974 | McCord | 180/69.1 |
| 3,809,175 | 5/1974 | Andrews | 180/69.1 |
| 3,815,702 | 6/1974 | Paananen | 180/69.1 |
| 3,965,503 | 6/1976 | Gridel | 428/74 X |
| 4,069,895 | 1/1978 | Beach et al. | 184/106 |
| 4,084,655 | 4/1978 | Savron | 180/69.1 |
| 4,484,661 | 11/1984 | Evenson | 184/106 |
| 4,664,959 | 5/1987 | Dagenais et al. | 428/74 |
| 4,671,024 | 6/1987 | Schumacher | 52/2 |
| 4,684,562 | 8/1987 | Hartkemeyer | 296/38 X |

*Primary Examiner*—Charles A. Marmor
*Assistant Examiner*—Brian L. Johnson
*Attorney, Agent, or Firm*—Dykema Gossett

[57] ABSTRACT

A disposable oil absorbent pad assembly adapted for suspension under a vehicle to collect oil, grease and hydraulic fluids, comprises a bottom layer of a metallic screen material, an intermediate layer of insulating material and a top layer of oil absorbent material. A binder peripherally secures and interconnects the layers throughout their entire outer peripheries, and grommets extend through corner portions of the assembled layers adapted to receive fasteners for suspending the pad assembly from the underside of a vehicle.

15 Claims, 2 Drawing Sheets

DISPOSABLE OIL ABSORBENT DRIP PAD ASSEMBLY FOR A VEHICLE

FIELD OF INVENTION

This invention relates to an oil absorbent drip pad which is suspended from the underside of a vehicle including automobiles, tractors, trucks, boats and marine vehicles to absorb leaking or dripping oil, grease and hydraulic fluids.

BACKGROUND OF THE INVENTION

Previously, oil, grease and hydraulic fluids are known to drop from the underside of a vehicle from various parts thereof, including the engine, crank csae transmission, differential or other engine or vehicle parts. This may be due to wear, deterioration of gaskets, and seals or normal operation of lubricated moving vehicle parts. Such oil generally drops down upon garage floors, driveways, streets and presents hazards to people and vehicles, including traffic. Such accumulated ground fluids are inflammable and may be slippery and can transfer from one vehicle to another and to people's shoes. Over the years various efforts have been made to protect such areas against the accumulation of oil, grease and hydraulic fluids by the use of drip pans or other receptacles into which the oil, grease or other fluid may descend and accumulate.

SUMMARY OF THE INVENTION

An important feature of the present invention is to provide a disposable oil absorbent drip pad assembly for a vehicle including automobiles, tractors and trucks, boats and marine vehicles to absorb oil, grease and hydraulic fluids which drip therefrom.

Another feature is to provide a disposable oil absorbent drip pad assembly adapted for suspension under the bottom of a vehicle for collecting oil, greasae and hyradulic fluids and which includes a bottom layer of a metallic screen material, an intermediate layer of insulating material, a top layer of oil absorbent material and means to peripherally bind, secure and interconnect the layers throughout their entire outer peripheries. Apertured grommets extend through corner portions of the assembled layers and are adapted to receive fasteners for suspending the drip pad assembly from a vehicle.

Still another feature is that the bottom screen layer stiffens the drip pad assembly to provide rigidity and to space the drip assembly from heat sources such as exhaust pipes, catalytic converters and the like.

A further feature is that the intermediate layer is constructed of an insulating material such as a fiberglass cloth which is resistent to temperatures to 1,000 degrees F. and protects the oil absorbent top layer from excessive heat from various heat sources on the underside of the vehicle.

A still further feature is that the top layer is of an oil absorbent material which is hyrdrophobic and thus prevents accumulation of any water within or upon the drip pad assembly.

Another feature is that the bottom layer, intermediate layer and top layer of an absorbent material are superimposed and peripherally connected together by a binding which is stitched thereover throughout their outer peripheries.

As another feature, grommets are mounted upon and extend through corner portions of the assembled layers and are adapted to receive suitable fasateners for suspending the drip pad assembly from the underside of the vehicle. The drip pad assembly is so positioned as to receive and collect and absorb any dripping oil, grease or hydraulic fluids.

These and other features and objects will be seen from the following specification and claims in conjunction with the appended drawings.

THE DRAWINGS

It will be understood that the above drawings illustrate merely a perferred embodiment of the invention, and that other embodiment are contemplated within the scope of the claims hereafter set forth.

DETAILED DESCRIPTION OF AN EMBODIMENT OF THE INVENTION

The present disposable oil absorbent drip pad assembly 11 in the illustrative embodiment is shown suspended from the underside of vehicle 12. While the drip pad assembly 11 may be suspended in any position under the vehicle along its length, in FIG. 1 it is shown suspended from the oil pan 17 of the vehicle engine n13.

It is contemplated that the present disposable drip pad assembly 11 may be suspended from the vehicle transmission or from the vehicle differential or from any other part upon the undersurface of the vehicle where there may be an opportunity to collect dripping fluids including, oil, grease and hydraulic fluids.

Figure 1:
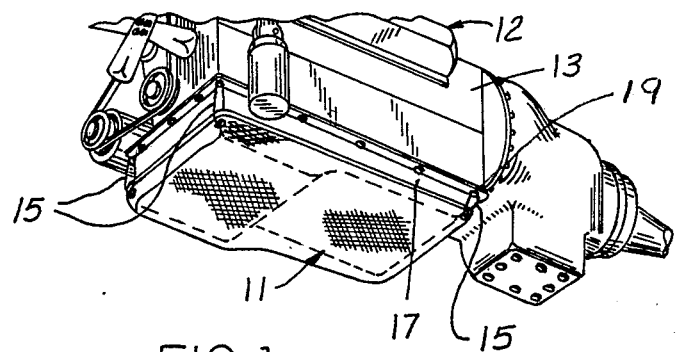
FIG. 1 is a fragmentary perspective view of the underside of a vehicle with the present disposable drip pad assembly suspended thereunder.

In the illustration shown in FIG. 1, the drip pad assembly 11 is mounted or suspended beneath the oil pan 17. It is contemplated that the drip pad assembly 11 may underlie any undersurface portion of the vehicle and be suspended from any non-moving part thereof as an equivalent construction.

The present disposable oil absorbent drip pad assembly 11 includes a bottom layer 21 of a screen material such as of aluminum, steel or fiberglass which is designed to provide rigidity to the drip pad assembly and stiffen the drip pad and space the other portions thereof from sources of heat such as the exhaust pipe or catalytic converter or tail pipe as the case may be. In the illustrative embodiment the bottom layer 21 is rectangular in shape. Mounted thereover is an intermediate insulating layer 23 which engages the bottom layer and is constructed of a suitable insulating material such as fiberglass cloth. The insulating layer is rectangular in shape corresponding to the shape of bottom layer 21. In the illustrative embodiment the cloth layer 23 is treated so that a large percent of the organic binders in the fabric are removed. The present fiberglass cloth will withstand continuous temperatures up to 1,000 degrees F. One source of the present fiberglass cloth is Great Lakes Textiles, Inc. of Cleveland, Ohio, sometimes referred to as fiberglass lagging cloth.

Overlying and in engagement with the intermediate layer 23 is the top layer 25 of oil absorbent material which is of similar rectangular shape. it is highly absorbent and is hydrophobic and therefore resists the accumulation of any water within the absorbent drip pad assembly. One source of the oil absorbent material is Absorbent Products Company, Inc. of Bound Brook, New Jersey. This oil absorbent material is sometimes referred to as S.P.C. Oil Absorbent and is effectively used because of its hig absorbent characteristics in oil spills and the like. It is also known for absorbing vast quantities of oil or grease and including hydraulic fluids. The material is known to soak up to 25 times its weight in petroleum products, is non-toxic and not affected by the high temperatures with which it is used when used as an oil absorbent drip pad upon the under surface of a vehicle where temperatures up to 500 degrees F are common.

Figure 3:
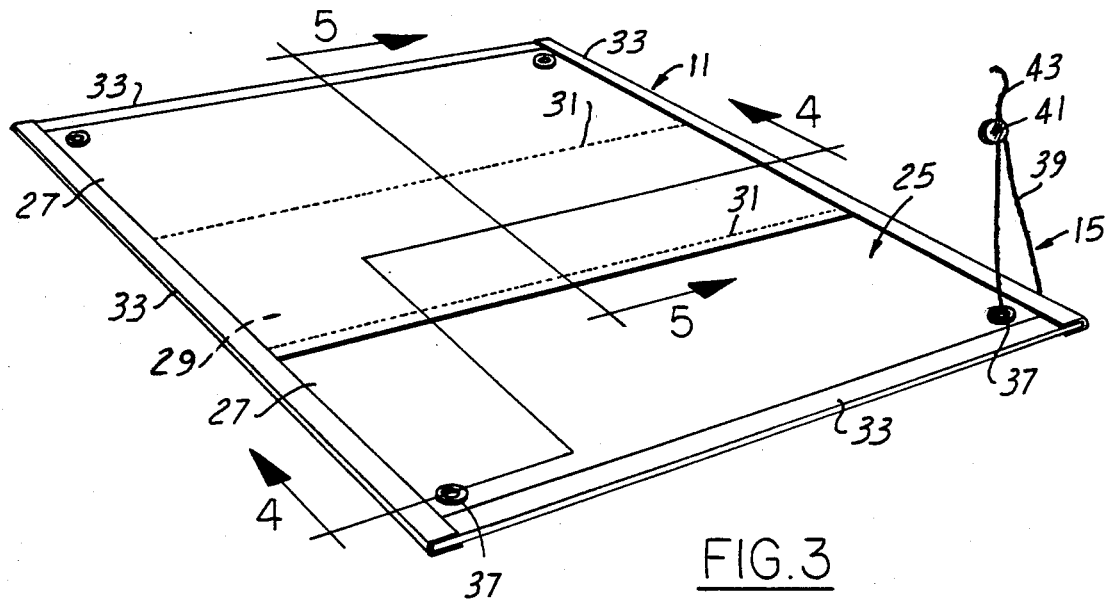
FIG. 3 is a front perspective view of the drip pad assembly assembled for use.

The present top layer 25 consists of a pair of longitudinally overlapped top layer elements 27 of similar rectangular shape which overlap at 29, FIG. 3. The corresponding one end of each top layer element 27 is stitched to an intermediate portion of the other top layer element 27 as by the transverse stitching 31. This provides an overlap portion 29 centrally of the oil absorbent pad 11, FIG. 3, which is of double thickness and doubly absorbent and increases the storage capacity of the present drip pad assembly 11.

Means are provided for peripherally securing the interconnecting respective layers 21, 23 andn 25 together throughout their entire outer peripheries. For this purpose there is provided a channel type of binding 33 which extends around the stacked layers and is peripherally secured thereto by the continuous stitching at 35, FIGS. 4 and 5. In the illustrative embodiment the stitching 31 and the stitching 35 is preferably a nylon thread. It is contemplated that under some circumstnces the stitching could be replaced by staples, though stitching is the preferred means of peripherally securing and interconnecting the respective layers 21, 23 and 25.

The material for the channel binding 33 is a fiberglass cloth material which will resist temperatures up to 1,000 degrees F. One source of this material is Pittsburgh Plate Glass Company of Pittsburgh, Pennsylvania.

Figure 4:
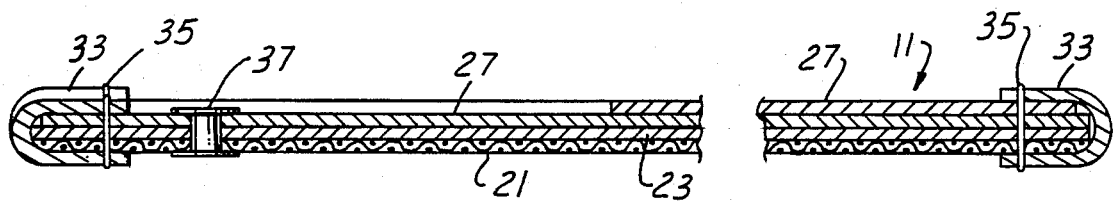
FIG. 4 is a fragmentary section taken in the direction of arrows 4—4 of FIG. 3, and on an increased scale.
Figure 5:
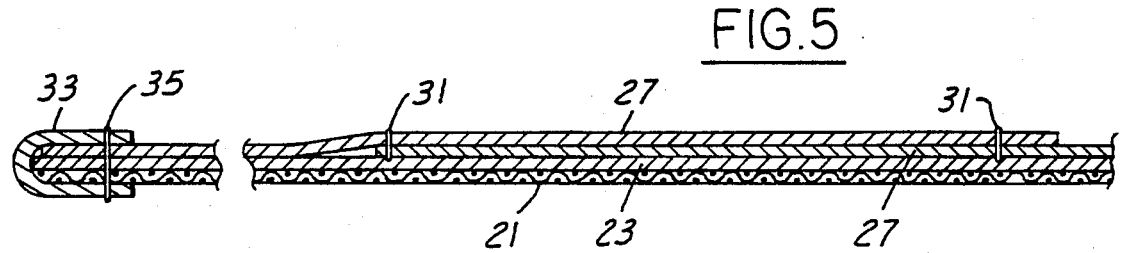
FIG. 5 is a fragmentary section taken in the direction of arrows 5—5 of FIG. 3, on an increased scale.

The present oil absorbent drip pad assembly 11 includes apertured mount means which extend through corner portions of the assembled layers adapted to receive fasteners for suspending the pad assembly 11 from the underside of a vehicle. In the illustrative embodiment the apertured mount means include two piece metallic grommets 37 which are assembled inwardly of a respective corners of the assembled layers as shown in FIGS. 2 through 4.

Figure 2:
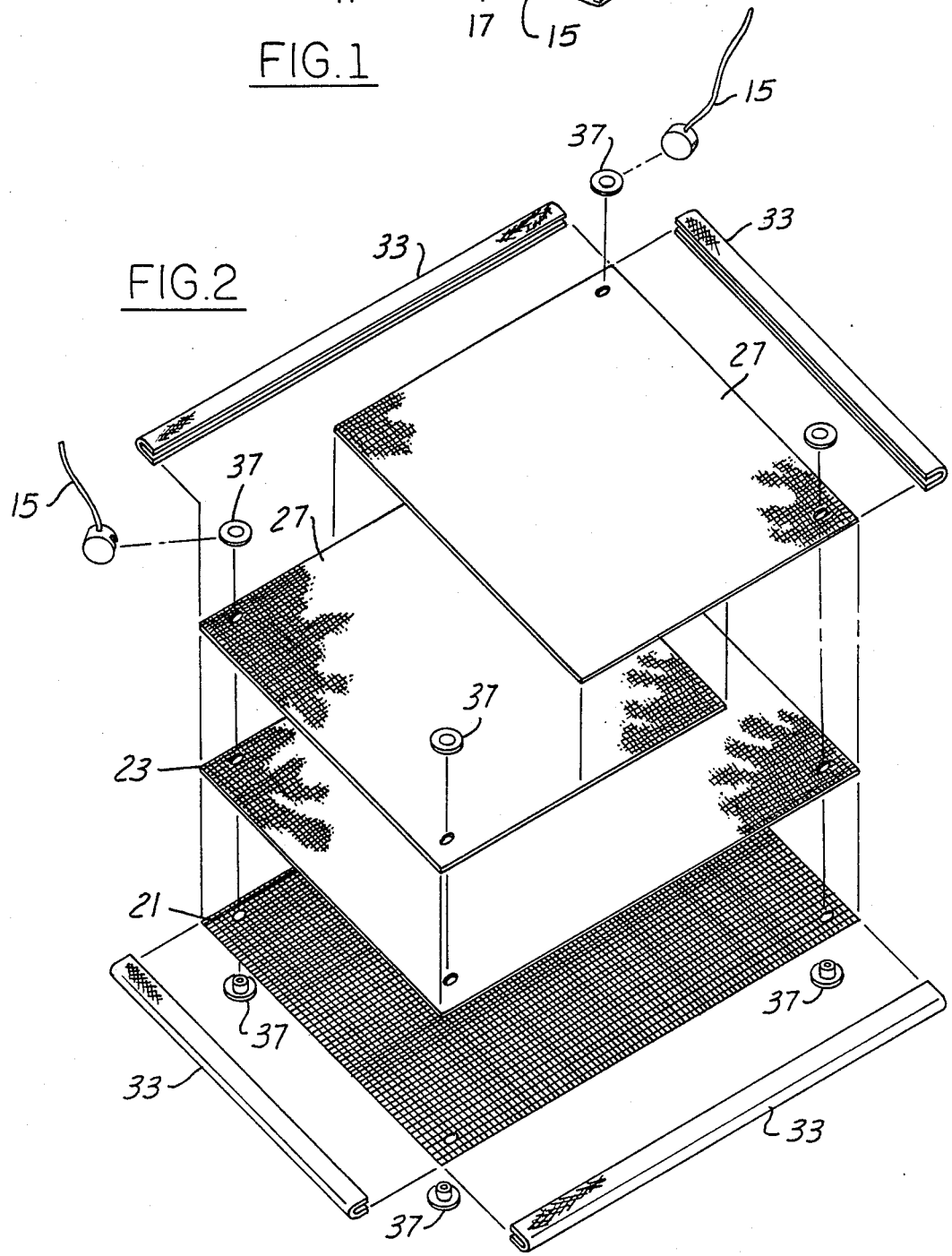
FIG. 2 is a perspective exploded view of the present drip pad assembly.

In the illustrative embodiment, flexible wire fasteners 15 are shown in FIG. 1 and in further detail in FIGS. 2 and 3. The fasteners 15 provide a means of securing the respective grommets 37 at the corners of the drip pad assembly 11 to under surface portions of the vehicle. In the illustrative embodiment each flexible wire fasteners 15 includes a wire 39 and a lead seal 41 so that when the fastener wire 39 is drawn through the lead seal the wire is then drawn tight against the lead body to anchor the seal 41 in place on the pad assembly 11. The wire 39 includes a connector or end portion 43 for attachment, as an example, to the bolts 19 shown in FIG. 1.

It is contemplated, however, that the grommets 37 and suitable fasteners, such as the wire fasteners 15, could be secured to any non-moving part upon the underside of the vehicle as an equivalent construction. One source of the present wire connectors is E.J. Brooks Company of Newark, New Jersey. Various fasteners may be employed which effectively extend through he corresponding grommets 37 as assembled FIGS. 3 and 4. These provide a means of suspending the oil absorbent drip pad assembly 11 from under surface portions of the vehicle in order to catch any dripping oil, grease or hydraulic fluids.

The present intermediate layer 23 of insulating material, as well as the continuous binding 33 which extends around the drip pad assembly forming a part thereof of resistent to heat up to temperatures of 1,000 degrees F. Grommets 37 are employed as one means of mounting and suspending the present drip pad assembly 11 from an under surface portion of a vehicle. It is conteplated that any other type of equivalent fastener could be connected to corner portions of the drip pad assembly 11 in order to receive a fastener such as the flexible wire fasteners 15 illustrated in detail in FIG. 3. Thus, the grommets 37 define one form of hanger means at the respective corners for mounting and suspension upon or below the undersurface of a vehicle. The present bottom layer 21, being of a metallic or fiberglass screen material, further prevents the pad from tearing or damaging and provides sufficient rigidity thereto. The present fiberglass cloth used for the insulator or intermediate layer 23 as well as for the binding 33 is heat retardant as well as being fire resistent.

The oil drip pad assembly 11 has been described herein when suspended beneath the bottom of a vehicle. A slightly modified pad assembly is contemplated when suspended relative to the power transmission or engine drive train of a boat or for other marine applications. In such boat or marine applications, the fiberglass or intermediate insulating layer 23 is eliminated. In addition, the screen material 21 preferred is fiberglass. It is further contemplated that the drip pad assembly may be mounted and suspended relative to the escaping fluids of air, land or sea vehicles.

Having described our invention, reference should now be had to the following claims:

We claim:

1. A disposable oil-absorbent drip pad assembly adapted for suspension under the bottom of a vehicle to collect oil, grease and hydraulic fluids, comprising:
   a bottom layer of a metallic screen material;
   an intermediate layer of insulating material overlying and engaging the bottom layer;
   a top layer of oil-absorbent material overlying and engaging the intermediate layer;
   said layers each having outer peripheries;
   means peripherally securing and interconnecting said layers throughout their peripheries;
   apertured mount means extending through portions of the assembled layers adapted to receive fasteners for suspending the pad assembly from a vehicle;
   each of said bottom, intermediate and top layers being generally planar and thus having two main axes, a first being defined as longitudinal and the second being defined as transverse; and
   said top layer consisting of a pair of longitudinally overlapped top layer elements, said elements being overlapped over a portion of their longitudinal extents thus defining overlapped areas, and laterally spaced transverse stitching interconnecting a longitudinal end portion of each top layer element with a longitudinally intermediate portion of the other top layer element.

2. In the drip pad assembly of claim 1, the overlapped areas of said top layer elements being of double thickness therefore having double the absorbing capacity.

3. In the drip pad assembly of claim 1, said securing means being constructed of an insulating material.

4. In the drip pad assembly of claim 3, the securing means including a peripheral binding of U-shape extending over the edges of said top, bottom and intermediate layers and secured thereto.

5. In the drip pad assembly of claim 4, the securing of said binding to said layers including continuous stitching extending through said binding and layers throughout all of their edges.

6. In the drip pad assembly of claim 4, said insulating material and said peripheral securing means being constructed of a fiberglass cloth material and resistant to temperatures up to 1000 degrees F.

7. In the drip pad assembly of claim 1, said securing means including a peripheral binding of U-shape extending over the edges of said top, bottom and intermediate layers and secured thereto.

8. In the drip pad assembly of claim 7, said securing means being constructed of a heat-insulating material.

9. In the drip pad assembly of claim 7, the securing of said binding to said layers including continuous stitching extending through said binding and layers throughout all of their edges.

10. In the drip pad assembly of claim 1, said apertured means including a plurality of metallic grommets extending through and secured to said portions.

11. A disposable oil-absorbent drip pad assembly adapted for suspension of relative to an air, land or sea vehicle to collect oil, grease and hydraulic fluids, comprising:
   a bottom layer of a screen material;
   a top layer of oil-absorbent material overlying the bottom layer;
   said layers each being defined by outer peripheries;
   means peripherally securing and interconnecting said layers throughout their peripheries;
   apertured mount means extending through portions of the assembled layers adapted to receive fasteners for suspending the pad assembly from a vehicle;
   each of said bottom and top layers being generally planar and thus having a longitudinal and a transverse axis; and
   said top layer consisting of a pair of longitudinally overlapped top layer elements, said elements being overlapped over a portion of their longitudinal extents thus defining overlapped areas, and laterally spaced transverse stitching interconnecting a longitudinal end portion of each top layer element with a longitudinally intermediate portion of the other top layer element.

12. In the drip pad assembly of claim 11, the overlapped areas of said top layer elements being of double thickness therefore having double the absorbing capacity.

13. In the drip pad assembly of claim 11, the securing means including a peripheral binding of U-shape extending over the edges of said top and bottom layers and secured thereto.

14. In the drip pad assembly of claim 13, the securing of said binding to said layers including continuous stitching extending through said binding and layers throughout their entire outer peripheries.

15. In the drip pad assembly of claim 11, said apertured means including a plurality of metallic grommets extending through and secured to said corner portions.

* * * * *